United States Patent
Kashima et al.

(10) Patent No.: US 10,476,423 B2
(45) Date of Patent: Nov. 12, 2019

(54) SYNCHRONOUS MOTOR CONTROL DEVICE, COMPRESSOR DRIVE SYSTEM, AND AIR CONDITIONER

(71) Applicant: Mitsubishi Electric Corporation, Tokyo (JP)

(72) Inventors: Mitsuo Kashima, Tokyo (JP); Tomohiro Kutsuki, Tokyo (JP); Tomomi Higashikawa, Tokyo (JP); Akiyoshi Muramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 120 days.

(21) Appl. No.: 15/574,504

(22) PCT Filed: Aug. 4, 2015

(86) PCT No.: PCT/JP2015/072088
§ 371 (c)(1),
(2) Date: Nov. 16, 2017

(87) PCT Pub. No.: WO2017/022081
PCT Pub. Date: Feb. 9, 2017

(65) Prior Publication Data
US 2018/0131308 A1    May 10, 2018

(51) Int. Cl.
*H02P 27/08* (2006.01)
*G05F 1/70* (2006.01)
(Continued)

(52) U.S. Cl.
CPC ............ *H02P 27/085* (2013.01); *F25B 13/00* (2013.01); *F25B 49/025* (2013.01); *G05F 1/70* (2013.01);
(Continued)

(58) Field of Classification Search
CPC ... H02H 3/36; H02P 6/00; H02P 21/00; H02P 27/04; H02P 1/00; H02P 25/022;
(Continued)

(56) References Cited

U.S. PATENT DOCUMENTS 5,818,192 A * 10/1998 Nozari ............... H02P 6/185
                                                    318/609
8,941,343 B2    1/2015 Lipp et al.
(Continued)

FOREIGN PATENT DOCUMENTS

JP    H10-243674 A    9/1998
JP    2009-136129 A    6/2009
(Continued)

OTHER PUBLICATIONS

International Search Report of the International Searching Authority dated Oct. 27, 2015 for the corresponding international application No. PCT/JP2015/072088 (and English translation).
(Continued)

*Primary Examiner* — Jorge L Carrasquillo
*Assistant Examiner* — Said Bouziane
(74) *Attorney, Agent, or Firm* — Posz Law Group, PLC

(57) ABSTRACT

A synchronous motor control device includes a voltage detector, a current detector, an inverter main circuit, and an inverter control unit. The inverter control unit includes: a phase current reproduction unit that reproduces a direct current into phase currents flowing to a permanent magnet synchronous motor; a current coordinate transformation unit that transforms the reproduced phase current into current on a control coordinate axis of a rotating coordinate system; a current control unit that calculates a voltage command value of the permanent magnet synchronous motor in such a
(Continued)

manner that the current on the control coordinate axis equals a specific value; and a limiter unit that limits the value of the voltage command value.

3 Claims, 7 Drawing Sheets

(51) Int. Cl.
| | |
|---|---|
| *H02P 3/22* | (2006.01) |
| *H02P 29/024* | (2016.01) |
| *F25B 49/02* | (2006.01) |
| *F25B 13/00* | (2006.01) |
| *H02P 21/34* | (2016.01) |
| *H02P 21/26* | (2016.01) |
| *H02P 29/032* | (2016.01) |
| *H02P 6/20* | (2016.01) |

(52) U.S. Cl.
CPC ............... *H02P 3/22* (2013.01); *H02P 6/20* (2013.01); *H02P 21/26* (2016.02); *H02P 21/34* (2016.02); *H02P 29/027* (2013.01); *H02P 29/032* (2016.02); *F25B 2600/021* (2013.01); *Y02B 30/741* (2013.01)

(58) Field of Classification Search
CPC .... H02P 29/027; H02K 1/223; H02K 21/042; H02K 11/048; G05F 1/70
See application file for complete search history.

(56) References Cited

U.S. PATENT DOCUMENTS

| | | | |
|---|---|---|---|
| 10,284,122 B2* | 5/2019 | Beckmann | ................ H02P 6/24 |
| 2006/0061310 A1* | 3/2006 | Takai | .................. B60L 15/2045 |
| | | | 318/139 |
| 2008/0061727 A1* | 3/2008 | Tomigashi | .............. H02P 21/14 |
| | | | 318/768 |
| 2009/0322264 A1* | 12/2009 | Imura | ................... B60L 15/025 |
| | | | 318/400.09 |
| 2012/0319632 A1 | 12/2012 | Lipp et al. | |
| 2018/0191288 A1* | 7/2018 | Li | ........................... H02P 21/00 |

FOREIGN PATENT DOCUMENTS

| | | |
|---|---|---|
| JP | 2009-195042 A | 8/2009 |
| JP | 2011-061887 A | 3/2011 |
| JP | 2013-038980 A | 2/2013 |
| JP | 2013-055788 A | 3/2013 |
| JP | 2013-055820 A | 3/2013 |
| JP | 2013-106424 A | 5/2013 |

OTHER PUBLICATIONS

Extended European Search Report dated Jan. 28, 2019 issued in corresponding EP patent application No. 15900394.6.

* cited by examiner

SYNCHRONOUS MOTOR CONTROL DEVICE, COMPRESSOR DRIVE SYSTEM, AND AIR CONDITIONER

CROSS REFERENCE TO RELATED APPLICATION

This application is a U.S. national stage application of International Patent Application No. PCT/JP2015/072088 filed on Aug. 4, 2015, the disclosure of which is incorporated herein by reference.

TECHNICAL FIELD

The present invention relates to a synchronous motor control device, a compressor drive system, and an air conditioner, the synchronous motor control device driving a plurality of switching elements in an inverter main circuit to convert DC power supplied from a DC bus into three-phase AC power and supplying the three-phase AC power to a permanent magnet synchronous motor.

BACKGROUND

A conventional synchronous motor control device disclosed in Patent Literature 1 sets a positioning mode and a synchronous operation mode subsequent to the positioning mode. In the positioning mode, a gradually increasing direct current is supplied to an armature winding of a permanent magnet synchronous motor at startup of the permanent magnet synchronous motor. In the synchronous operation mode, an alternating current with variable voltage and variable frequency is supplied to the armature winding. The synchronous motor control in the positioning mode device detects a current value flowing through the armature winding of the permanent magnet synchronous motor, and, when the current value is smaller than or equal to a preset threshold, determines that the permanent magnet synchronous motor is not connected to the synchronous motor control device and then generates an alarm.

PATENT LITERATURE

Patent Literature 1: Japanese Patent Application Laid-Open No. 2009-195042

The conventional synchronous motor control device in the positioning mode detects the current value flowing through the armature winding of the permanent magnet synchronous motor in the positioning mode and, when the current value is smaller than or equal to the preset threshold, determines that the permanent magnet synchronous motor is not connected to the synchronous motor control device. Where the current flowing through the permanent magnet synchronous motor is detected by a voltage drop across a shunt resistor that is disposed on a DC bus of the synchronous motor control device, the current value becomes smaller than or equal to the threshold with the shunt resistor being short-circuited due to a solder bridge or contact with solder residue. In such a state, an excessive current flows through the permanent magnet synchronous motor and the synchronous motor control device before the synchronous motor control device determines the non-connection between the device and the motor when the device subjects the current value to PI control (Proportional Integral Controller) in the positioning mode. This may cause demagnetization of the synchronous motor and a failure of the synchronous motor control device due to the overcurrent, which results in a reduction in quality of the device.

SUMMARY

The present invention has been made in view of the aforementioned problem. An object of the invention is to provide a synchronous motor control device capable of improving the quality.

To solve the problem and achieve the object, the present invention provides a synchronous motor control device for controlling a permanent magnet synchronous motor, the device converting DC power supplied from a DC power supply into three-phase AC power, the device includes: an inverter main circuit to convert the DC power into the three-phase AC power by using a plurality of switching elements and supply the three-phase AC power to the permanent magnet synchronous motor; a current detector to detect a direct current flowing through a DC bus between the DC power supply and the inverter main circuit; a voltage detector to detect a DC voltage between a positive side of the DC bus and a negative side of the DC bus; and an inverter control unit to generate a pulse width modulation signal from the direct current and the DC voltage for controlling each of the plurality of switching elements, and output the pulse width modulation signal to the inverter main circuit. The inverter control unit includes: a phase current reproduction unit to reproduce from the direct current, phase currents flowing to the permanent magnet synchronous motor; a current coordinate transformation unit to transform the reproduced phase currents into current on a control coordinate axis of a rotating coordinate system; a current control unit to calculate a voltage command value of the permanent magnet synchronous motor in such a manner that the current on the control coordinate axis equals a specific value; and a limiter unit to limit a value of the voltage command value.

The synchronous motor control device according to the present invention can have improved quality.

DETAILED DESCRIPTION

A synchronous motor control device, a compressor drive system, and an air conditioner according to embodiments of the present invention will now be described in detail with reference to the drawings. Note that the present invention is not limited to the embodiments.

First Embodiment

Figure 1:
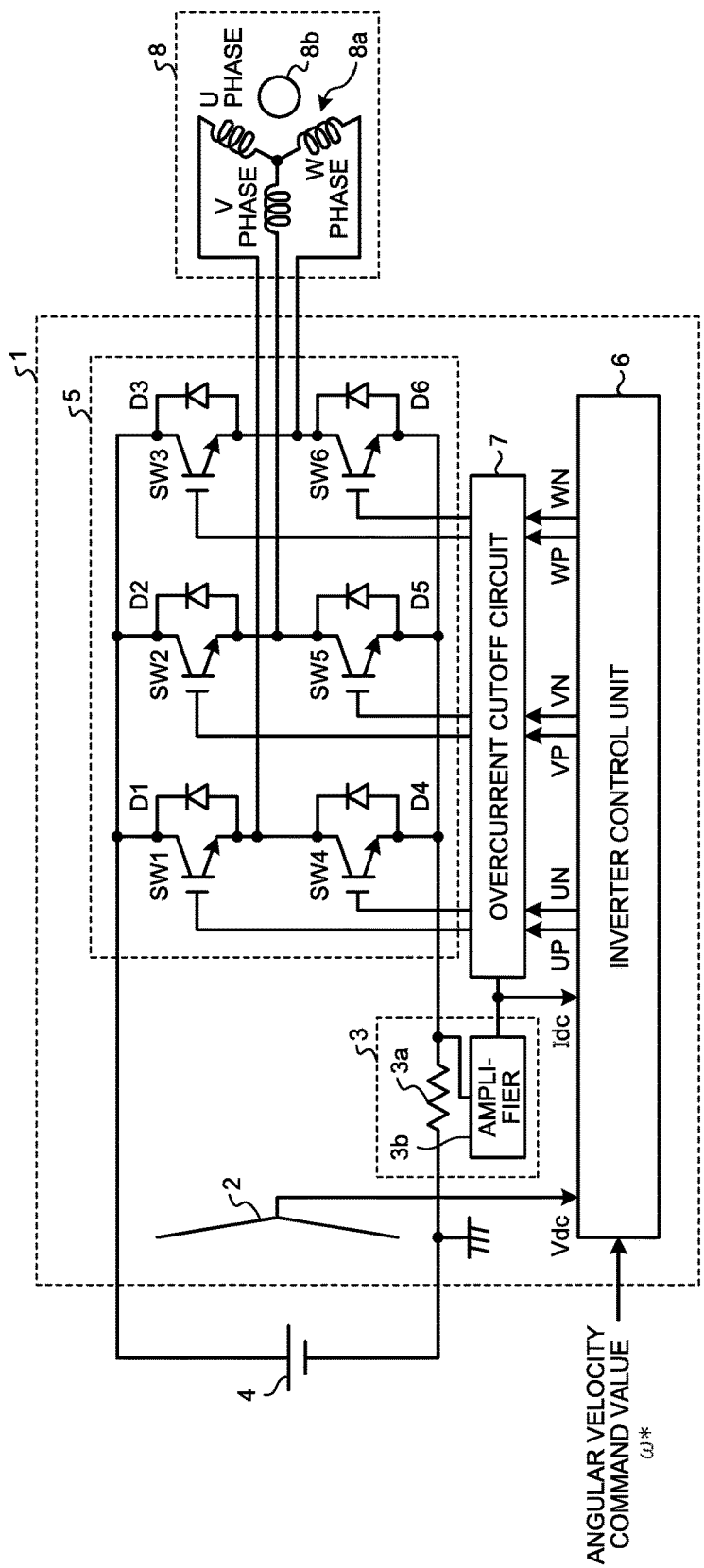
FIG. 1 is a diagram illustrating a synchronous motor control device according to a first embodiment of the present invention and a permanent magnet synchronous motor driven by the synchronous motor control device.

FIG. 1 is a diagram illustrating a synchronous motor control device according to a first embodiment of the present invention and a permanent magnet synchronous motor driven by the synchronous motor control device. A synchronous motor control device 1 includes: a current detector 3 that detects a direct current flowing through a DC bus between a DC power supply 4 and an inverter main circuit 5; a voltage detector 2 that detects a DC voltage between positive and negative sides of the DC bus; the inverter main circuit 5 connected to the DC power supply 4 via the DC bus; an inverter control unit 6; and an overcurrent cutoff circuit 7.

A three-phase permanent magnet synchronous motor 8 driven by three-phase AC power is connected to the inverter main circuit 5. The permanent magnet synchronous motor 8 has a Y-connected three-phase stator 8a including a U phase, a V phase, and a W phase, and a permanent magnet rotor 8b disposed inside the stator 8a. In order to simplify the explanation, the synchronous motor control device and the permanent magnet synchronous motor may simply be referred to as a controller and a synchronous motor, respectively.

The DC power supply 4 may be an output of a converter circuit (not illustrated) that converts AC power into DC power and outputs the DC power, or may be DC power generated by a power supply circuit other than the converter circuit.

The current detector 3 detects a direct current flowing through the DC bus between the DC power supply 4 and the inverter main circuit 5, and is defined by a shunt resistor 3a and an amplifier 3b. Although the current detector 3 is configured to use the shunt resistor in the first embodiment, the current detector 3 may also be configured to use a current sensor with better responsiveness using a Hall sensor, for example.

The inverter main circuit 5 includes a plurality of switching elements SW1, SW2, SW3, SW4, SW5, and SW6, a plurality of diodes D1, D2, D3, D4, D5, and D6 connected in anti-parallel to the corresponding switching elements SW1 to SW6, and a drive circuit (not illustrated) for driving each of the plurality of switching elements SW1 to SW6. The three switching elements SW1, SW2, and SW3 disposed on the positive side of the DC bus make up an upper arm switching element group, and the three switching elements SW4, SW5, and SW6 disposed on the negative side of the DC bus make up a lower arm switching element group.

The inverter main circuit 5 is formed of an intelligent power module (IPM) in the first embodiment. Also in the first embodiment, the switching elements SW1 to SW6 of the inverter main circuit 5 are each formed of an insulated gate bipolar transistor (IGBT). The inverter main circuit 5 is however not limited to the aforementioned configuration but may use a semiconductor switch such as an insulated gate controlled thyristor (IGCT) or a field effect transistor (FET).

The inverter control unit 6 generates pulse width modulation (PWM) signals for driving the plurality of switching elements SW1 to SW6 of the inverter main circuit 5, on the basis of DC voltage information Vdc detected by the voltage detector 2, direct current information Idc detected by the current detector 3, and an angular velocity command value $\omega^*$ input from the outside.

The PWM signals for driving the plurality of switching elements SW1 to SW6 are denoted as UP, UN, VP, VN, WP, and WN in FIG. 1. The signals UP, VP, and WP are the PWM signals for the upper arm switching element group disposed on the positive side of the DC bus in the inverter main circuit 5, and serve as driving signals for the plurality of switching elements SW1, SW2, and SW3, respectively. The signals UN, VN, and WN are the PWM signals for the lower arm switching element group disposed on the negative side of the DC bus in the inverter main circuit 5, and serve as driving signals for the plurality of switching elements SW4, SW5, and SW6, respectively.

The overcurrent cutoff circuit 7 is a function for forcibly keeping the switching elements SW1 to SW6 of the inverter main circuit 5 in an OFF state on the basis of the magnitude of the direct current information Idc detected by the current detector 3. With a preset protection level set in the overcurrent cutoff circuit 7, the overcurrent cutoff circuit 7 supplies the PWM signals output from the inverter control unit 6 to the inverter main circuit 5 when the direct current information Idc does not exceed the protection level. When the direct current information Idc exceeds the protection level, the overcurrent cutoff circuit 7 outputs to each of the switching elements SW1 to SW6 a control signal for forcibly keeping the switching elements SW1 to SW6 of the inverter main circuit 5 in the OFF state.

Figure 2:
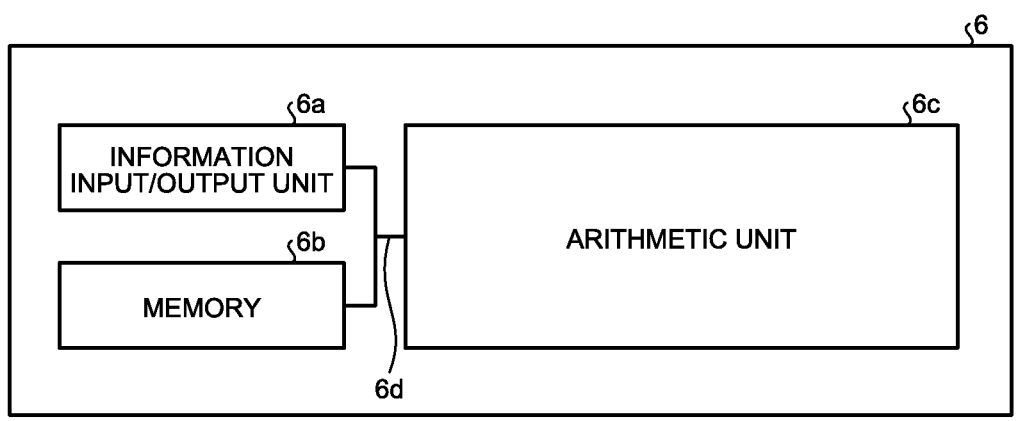
FIG. 2 is a diagram illustrating the hardware configuration of an inverter control unit of the synchronous motor control device according to first embodiment of the present invention.

FIG. 2 is a diagram illustrating the hardware configuration of the inverter control unit according to first embodiment of the present invention. The inverter control unit 6 includes an information input/output unit 6a, a memory 6b, and an arithmetic unit 6c. The information input/output unit 6a, the memory 6b, and the arithmetic unit 6c are connected by a data bus 6d.

The information input/output unit 6a is an interface circuit provided for the arithmetic unit 6c to receive and transmit information from and to external devices. In the first embodiment, the information input/output unit 6a receives the DC voltage information Vdc, the direct current information Idc, and the angular velocity command value $\omega^*$. Also, the information input/output unit 6a outputs a PWM signal generated by the arithmetic unit 6c. As discussed later, the DC voltage information Vdc, the direct current information Idc, and the angular velocity command value $\omega^*$ input to the information input/output unit 6a are used by a PWM signal generation unit 16, a phase current reproduction unit 9, and an integration unit 17, respectively, for their calculations.

The memory 6b is a random access memory (RAM) or a read only memory (ROM), a solid state drive (SSD), a hard disk drive (HDD), or a combination of those.

The arithmetic unit 6c is a processor such as a central processing unit (CPU) or a micro processing unit (MPU).

A program for the arithmetic unit 6c is stored in the memory 6b and is executed by the arithmetic unit 6c to implement the phase current reproduction unit 9, a current coordinate transformation unit 10, a filter unit 11, a current command generation unit 12, a current control unit 13, a limiter unit 14, a voltage coordinate transformation unit 15, the PWM signal generation unit 16, and the integration unit 17, all of which are discussed later.

The configuration of the inverter control unit 6 at startup will now be described with reference to FIG. 3.

Figure 3:
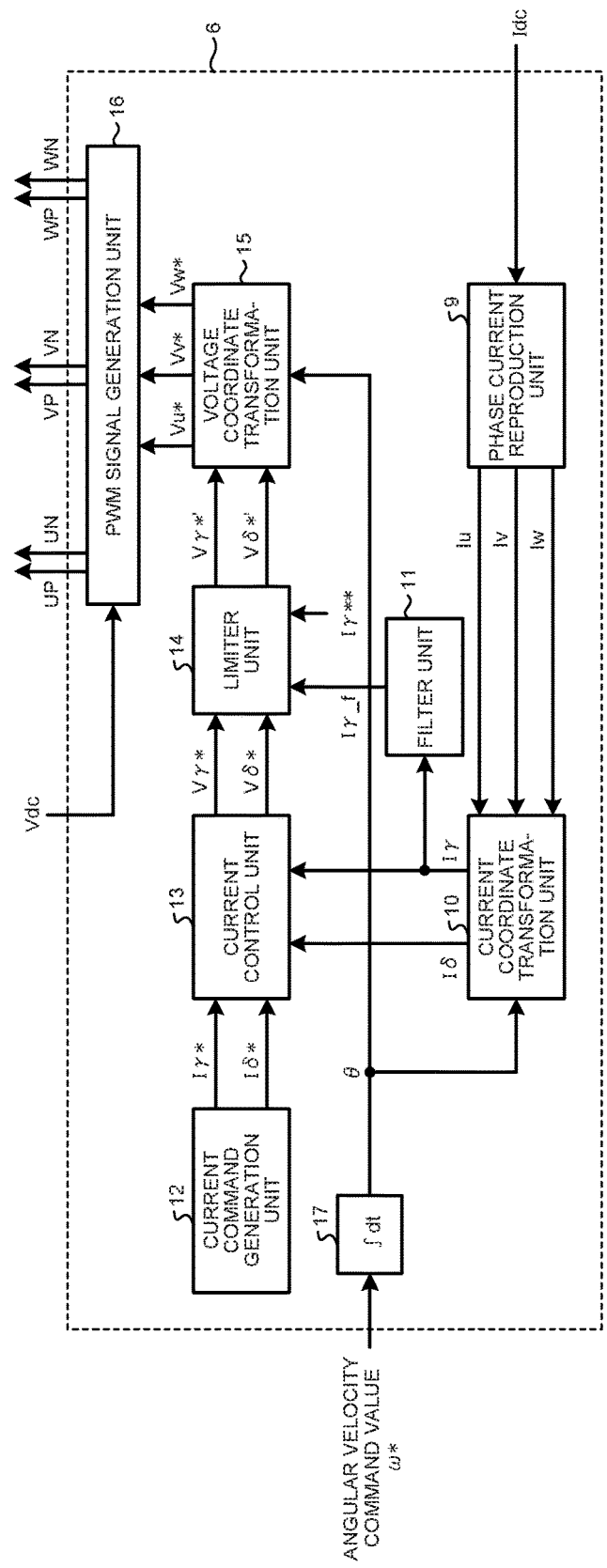
FIG. 3 is a block diagram of the inverter control unit at startup according to the first embodiment of the present invention.

FIG. 3 is a block diagram of the inverter control unit at startup according to the first embodiment of the present invention. From the direct current information Idc detected by the current detector 3, the phase current reproduction unit 9 reproduces phase current information Iu, Iv, and Iw on respective phase currents flowing to the synchronous motor 8. The current coordinate transformation unit 10 transforms the phase current information Iu, Iv, and Iw into values on a control axis ($\gamma$-$\delta$ axes) of a rotating coordinate system on the basis of a phase $\theta$. That is, the current coordinate transformation unit 10 transforms the phase current information Iu, Iv, and Iw into a $\gamma$-axis current I$\gamma$ and a $\delta$-axis current I$\delta$ and outputs these currents. The filter unit 11 outputs, to the limiter unit 14, a $\gamma$-axis current filter value I$\gamma$_f obtained by multiplying the $\gamma$-axis current I$\gamma$ by a first-order lag filter such as a filter time constant of 5 ms.

The current command generation unit 12 outputs a $\gamma$-axis current command value I$\gamma$* which is a command value for the $\gamma$-axis current I$\gamma$ and a $\delta$-axis current command value I$\delta$* which is a command value for the $\delta$-axis current I$\delta$. The $\gamma$-axis current command value I$\gamma$* and the $\delta$-axis current command value I$\delta$* are values preset in the current command generation unit 12 for startup control.

The current control unit 13 uses PI control and calculates a $\gamma$-axis voltage command value V$\gamma$* and a $\delta$-axis voltage command value V$\delta$* such that the $\gamma$-axis current I$\gamma$ and the $\delta$-axis current I$\delta$ output from the current coordinate transformation unit 10 agree with the $\gamma$-axis current command value I$\gamma$* and the $\delta$-axis current command value I$\delta$* output from the current command generation unit 12, respectively. That is, the current control unit 13 calculates a voltage command value for the synchronous motor 8 such that the current value on the control coordinate axis equals a specific value.

The limiter unit 14 limits the $\gamma$-axis voltage command value V$\gamma$* and the $\delta$-axis voltage command value V$\delta$* output from the current control unit 13, and outputs to the voltage coordinate transformation unit 15 a $\gamma$-axis voltage command value V$\gamma$*' and a $\delta$-axis voltage command value V$\delta$*' that have been subjected to the limitation.

The voltage coordinate transformation unit 15 transforms the $\gamma$-axis voltage command value V$\gamma$*' and the $\delta$-axis voltage command value V$\delta$*' output from the limiter unit 14 into three-phase voltage command values Vu*, Vv*, and Vw* on the basis of the phase $\theta$.

The integration unit 17 integrates the angular velocity command value $\omega$* and obtains the phase $\theta$, which is used in the current coordinate transformation unit 10 and the voltage coordinate transformation unit 15.

From the three-phase voltage command values Vu*, Vv*, and Vw* output from the voltage coordinate transformation unit 15 and the DC voltage information Vdc, the PWM signal generation unit 16 generates PWM signals for driving the switching elements SW1 to SW6.

Next, the overall operation of the synchronous motor control device 1 will be described.

When the direct current information Idc does not exceed the overcurrent protection level, the PWM signals UP to WN generated by the inverter control unit 6 are supplied to the switching elements SW1 to SW6 of the inverter main circuit 5, respectively. However, with the terminals of the shunt resistor 3a being short-circuited due to a solder bridge or contact with solder residue, the overcurrent cutoff circuit 7 does not operate even if a current exceeding the overcurrent protection level flows to the synchronous motor, in which case the PWM signals UP to WN generated by the inverter control unit 6 continue to be supplied to the inverter main circuit 5.

When the synchronous motor 8 is used as a drive source of a compressor incorporated in a room air conditioner (not illustrated), the resistance value of the shunt resistor 3a is set to about 10 m$\Omega$ in order to prevent a loss due to the shunt resistor 3a. It is thus difficult to detect whether or not the shunt resistor 3a is short-circuited. When the shunt resistor 3a is designed to have a plurality of chip resistors disposed in parallel to provide resistance accuracy and achieve dispersion of generated heat, the shunt resistor 3a is more likely to be short-circuited due to the solder bridge or contact with solder residue.

The operation of the inverter control unit 6 of the first embodiment will now be described with reference to FIGS. 4 to 6.

Figure 4:
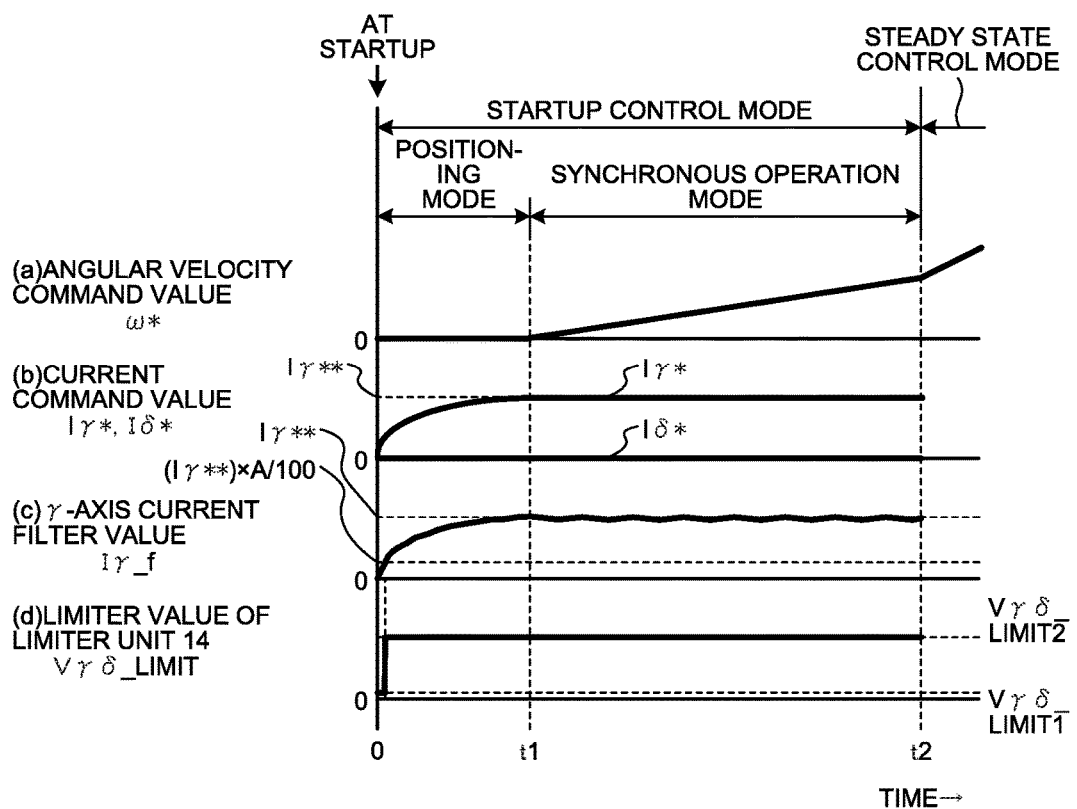
FIG. 4 is a timing diagram illustrating the operation of the synchronous motor control device at startup according to the first embodiment of the present invention when a shunt resistor is not short-circuited.

FIG. 4 is a timing diagram illustrating the operation of the synchronous motor control device at startup according to the first embodiment of the present invention when the shunt resistor is not short-circuited. The synchronous motor control device 1 is in a normal state when the shunt resistor is not short-circuited. In FIG. 4, (a) represents the angular velocity command value $\omega$*, (b) represents the $\gamma$-axis current command value I$\gamma$* and $\delta$-axis current command value I$\delta$* output from the current command generation unit 12, (c) represents a $\gamma$-axis current filter value I$\gamma$_f output from the filter unit 11, and (d) represents a limiter value V$\gamma\delta$_LIMIT for the $\gamma$-axis voltage command value V$\gamma$* and the $\delta$-axis voltage command value V$\delta$* used in the limiter unit 14.

The $\gamma$-axis voltage command value V$\gamma$* and the $\delta$-axis voltage command value V$\delta$* share the common limiter value V$\gamma\delta$_LIMIT, where the maximum limiter value and the minimum limiter value of the limiter unit 14 are represented as "+V$\gamma\delta$_LIMIT" and "−V$\gamma\delta$_LIMIT", respectively.

From startup to time t1 in FIG. 4, the operation is set to a positioning mode in which the inverter control unit performs control to fix the angular velocity command value $\omega$* to 0 [rad/s] and cause a current to flow through a specific current path of the synchronous motor 8. For example, the inverter control unit 6 in the positioning mode performs control such that currents of the equal magnitude flow from the U phase of the stator 8a of the synchronous motor 8 in the directions to the V phase and the W phase, whereby magnetic poles (not illustrated) of the permanent magnet rotor 8b are positioned at the positions corresponding to the currents.

From time t1 to time t2, the operation is set to a synchronous operation mode in which a synchronous operation is performed such that the angular velocity command value $\omega$* reaches a specific angular velocity. After time t2, the operation is set to a steady state control mode in which position sensorless control is performed in the steady state.

The positioning mode and the synchronous operation mode are collectively referred to as a startup control mode. The method of performing the position sensorless control on the synchronous motor 8 in the steady state is disclosed in numerous prior arts and thus will not be described.

The $\gamma$-axis current command value I$\gamma$* output from the current command generation unit 12 is set to 0 [A] at a point of time of startup and set to approach a target value I$\gamma$** by the first-order lag such as a filter time constant of 100 ms.

The target value I$\gamma$** is set to a value allowing flow of a phase current with which a starting torque required for the synchronous motor 8 can be reliably obtained.

The δ-axis current command value Iδ* is fixed to 0 [A]. In this case, an effective value of the phase current of the synchronous motor 8 is controlled to converge to "Iγ*/√3".

The γ-axis current filter value Iγ_f output from the filter unit 11 operates so as to follow the γ-axis current command value Iγ* when the control device 1 is in the normal state.

The limiter unit 14 includes in advance two limiter values, namely a first limiter value Vγδ_LIMIT1 and a second limiter value Vγδ_LIMIT2, as the limiter value Vγδ_LIMIT. The limiter unit 14 switches the limiter value between the two limiter values on the basis of the γ-axis current filter value Iγ_f output from the filter unit 11 and the target value Iγ** of the γ-axis current command value Iγ*.

The limiter unit 14 sets the first limiter value Vγδ_LIMIT1 expressed by Expression (1) below, this first limiter value Vγδ_LIMIT1 being defined as the limiter value Vγδ_LIMIT at the point of time of startup.

[Expression 1]

$$V\gamma\delta\_LIMIT1 = Ra \times OC\_LEVEL \times \sqrt{(3/2)} \times \alpha \quad (1)$$

Ra denotes a phase resistance value of the synchronous motor 8, and OC_LEVEL denotes the overcurrent protection level set to a current value with which demagnetization of the permanent magnet rotor 8b of the synchronous motor 8 as well as a failure of the inverter main circuit 5 due to overcurrent can be prevented.

Moreover, α denotes a correction factor set in consideration of variations in switching among the switching elements SW1 to SW6 of the inverter main circuit 5 or variations in the voltage detected by the voltage detector 2. The correction factor is a value of 1 or smaller.

The limiter unit 14 further sets the second limiter value Vγδ_LIMIT2 to a value larger than the first limiter value Vγδ_LIMIT1. The second limiter value Vγδ_LIMIT2 is, for example, a limit value in the steady state control. The limiter unit 14 applies this limiter value after the point of time when the γ-axis current filter value Iγ_f reaches A [%] of the target value Iγ** in the positioning mode. The value of A is set to 25, for example.

The inverter control unit 6 determines that the shunt resistor 3a is possibly short-circuited when the γ-axis current filter value Iγ_f does not reach A [%], in which case the first limiter value Vγδ_LIMIT1 is kept as the limiter value of the limiter unit 14 to prevent demagnetization of the permanent magnet rotor 8b of the synchronous motor 8 and breaking of the inverter main circuit 5 due to overcurrent. When the control device 1 is in the normal state as illustrated in FIG. 4, the γ-axis current filter value Iγ_f reaches A [%] of the target value Iγ so that the limiter value of the limiter unit 14 is switched to "Vγδ_LIMIT2".

When there is no particular limit value set as the second limiter value Vγδ_LIMIT2 in the steady state control, the inverter control unit 6 may allow the γ-axis voltage command value Vγ* and the δ-axis voltage command value Vδ*, which are output from the current control unit 13, to be input directly to the voltage coordinate transformation unit 15.

Figure 5:
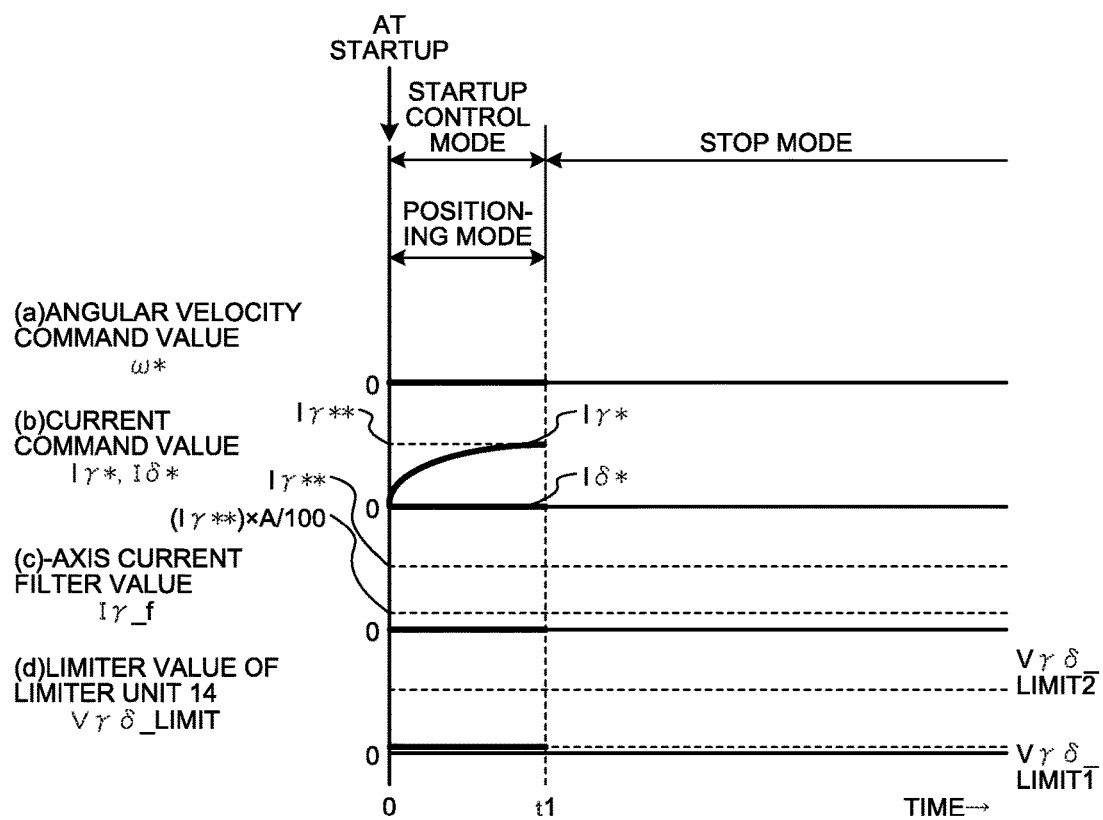
FIG. 5 is a timing diagram illustrating the operation of the synchronous motor control device at startup according to the first embodiment of the present invention when the shunt resistor is short-circuited.

FIG. 5 is a timing diagram illustrating the operation of the synchronous motor control device at startup according to the first embodiment of the present invention when the shunt resistor is short-circuited. In FIG. 5, (a) to (d) represent the same values as the values represented by (a) to (d) in FIG. 4.

When the shunt resistor 3a is short-circuited, a current is supplied to the synchronous motor 8 in the positioning mode but such a supply of current cannot be detected due to the shunt resistor 3a being short-circuited. As a result, the γ-axis current filter value Iγ_f is smaller than A [%] of the target value Iγ**. The limiter unit 14 thus keeps the first limiter value Vγδ_LIMIT1 as the limiter value, thereby preventing demagnetization of the permanent magnet rotor 8b of the synchronous motor 8 and breaking of the inverter main circuit 5 due to overcurrent.

The γ-axis current filter value Iγ_f is smaller than A [%] of the target value Iγ** in the positioning mode when the control device 1 is not connected to the synchronous motor 8 in addition to when the shunt resistor 3a is short-circuited. The γ-axis current filter value is also smaller than A [%] of the target value when the switching element SW1 experiences an open fault with the U phase being the open phase at the time of supplying currents of the equal magnitude in the directions of the V phase and the W phase from the U phase of the stator 8a of the synchronous motor 8 through a specific current path in the positioning mode, for example.

In any case, the inverter control unit 6 can determine that some abnormality has occurred and thus shifts to a stop mode in which all of the switching elements SW1 to SW6 of the inverter main circuit 5 are turned off upon the lapse of time t1.

The operation of the inverter control unit 6 at startup will now be described with reference to a flowchart of FIG. 6.

Figure 6:
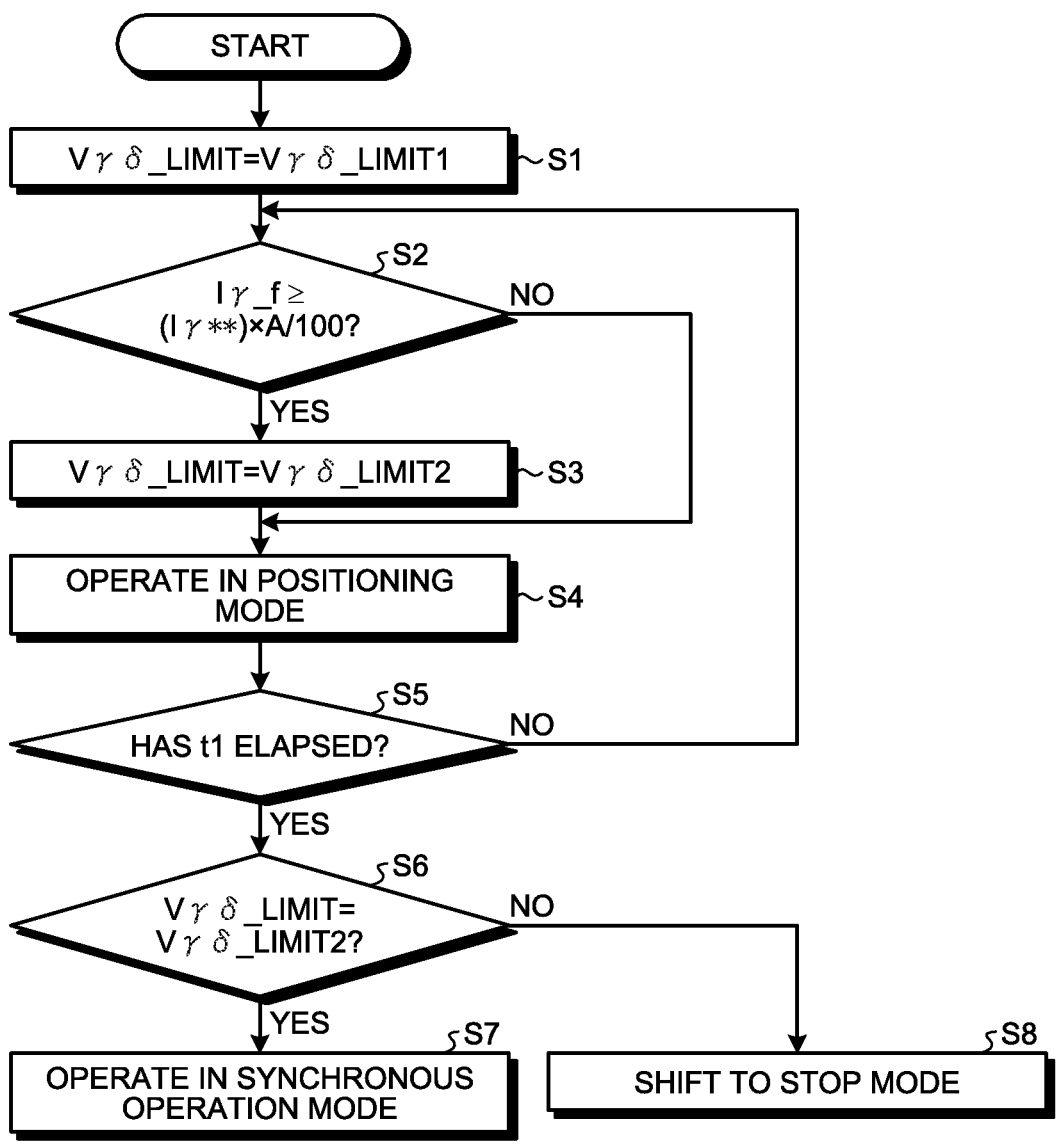
FIG. 6 is a flowchart of the operation of the synchronous motor control device at startup according to the first embodiment of the present invention.

FIG. 6 is a flowchart of the synchronous motor control device at startup according to the first embodiment of the present invention. The inverter control unit 6 sets the limiter value Vγδ_LIMIT of the limiter unit 14 to the first limiter value Vγδ_LIMIT1 as the initial value at the point of time of startup (S1).

The inverter control unit 6 determines whether or not the γ-axis current filter value Iγ_f is larger than or equal to "(Iγ**)×A/100" (S2).

When the γ-axis current filter value Iγ_f is larger than or equal to "(Iγ**)×A/100" (Yes in S2), the inverter control unit 6 performs processing to set the second limiter value Vγδ_LIMIT2 as the limiter value Vγδ_LIMIT of the limiter unit 14 (S3), and operates in the positioning mode (S4). As a result, the magnetic poles of the permanent magnet rotor 8b are positioned in accordance with the angular velocity command value ω*, the γ-axis current command value Iγ*, and the δ-axis current command value Iδ* indicated in the section from startup to time t1 in FIGS. 4 and 5.

The inverter control unit 6 performs the processing of S4 when the γ-axis current filter value Iγ_f is smaller than "(Iγ**)×A/100" (No in S2).

Following the processing of S4, the inverter control unit 6 determines whether or not time t1 has elapsed (S5).

When time t1 has not elapsed (No in S5), the inverter control unit 6 repeatedly performs the processing from S2 to S4.

When time t1 has elapsed (Yes in S5), the inverter control unit 6 performs the processing of S6. Then, the limiter value Vγδ_LIMIT of the limiter unit 14 is kept at the first limiter value Vγδ_LIMIT1 when the condition of S2 has never been satisfied, or set to the second limiter value Vγδ_LIMIT2 when the condition of S2 has been satisfied at least once.

In S6, the inverter control unit 6 determines whether or not the limiter value Vγδ_LIMIT agrees with the second limiter value Vγδ_LIMIT2.

The inverter control unit 6 operates in the synchronous operation mode (S7) when the limiter value Vγδ_LIMIT agrees with the second limiter value Vγδ_LIMIT2 (Yes in S6). As a result, the synchronous motor 8 is controlled according to the angular velocity command value ω*, the γ-axis current command value Iγ*, and the δ-axis current command value Iδ* indicated in the section from time t1 to time t2 in FIG. 4.

When the limiter value Vγδ_LIMIT does not agree with the second limiter value Vγδ_LIMIT2 (No in S6), the inverter control unit 6 determines that some abnormality has occurred including a short-circuit of the shunt resistor 3a and shifts to the stop mode (S8) in which all the switching elements SW1 to SW6 are turned off.

As described above, the synchronous motor control device 1 according to the first embodiment includes the inverter main circuit, the current detector, the voltage detector, and the inverter control unit. The inverter control unit includes the phase current reproduction unit, the current coordinate transformation unit, the current control unit, and the limiter unit limiting the value of the voltage command value. The current flowing in the synchronous motor is detected by a voltage drop across the shunt resistor disposed on the DC bus. Such a configuration prevents demagnetization of the synchronous motor and a failure of the synchronous motor control device due to overcurrent, thereby improving the quality even when the shunt resistor is short-circuited due to a solder bridge or contact with solder residue.

The inverter control unit 6 is configured to switch the limiter value to the second limiter value to limit the γ-axis voltage command value and the δ-axis voltage command value in the steady state control, when the γ-axis current filter value reaches A[%] or larger of Iγ** which is the target value of the γ-axis current command value at least once even in the middle of the positioning mode. Therefore, the influence of the first limiter value on the positioning of the permanent magnet rotor of the synchronous motor can be kept to the minimum when the synchronous motor control device is in the normal state.

Second Embodiment

Figure 7:
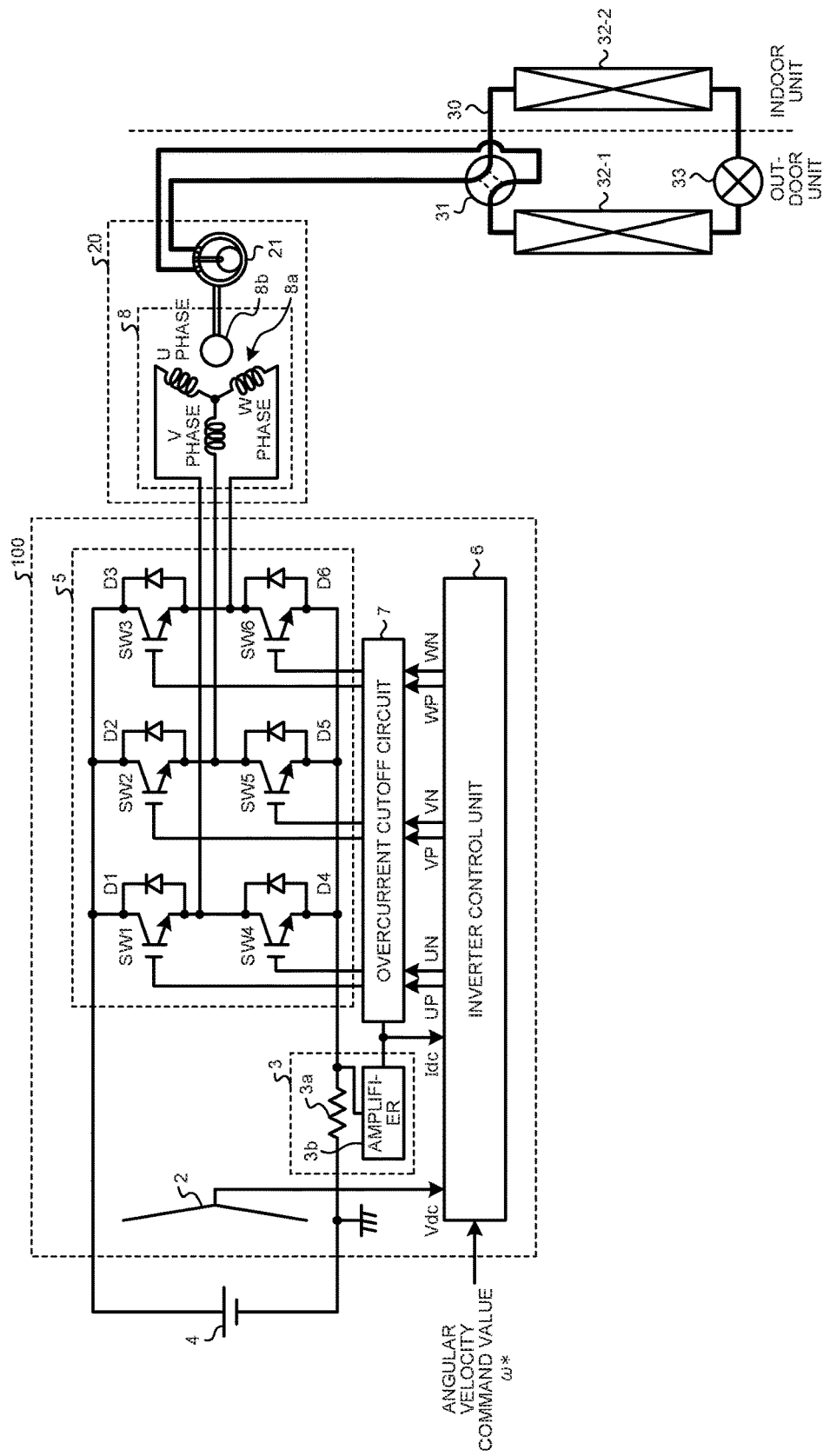
FIG. 7 is a diagram illustrating the configuration of an air conditioner, focusing on a compressor drive system according to a second embodiment of the present invention.

FIG. 7 is a diagram illustrating the configuration of an air conditioner, focusing on a compressor drive system according to a second embodiment of the present invention. A compressor drive system 100 of the second embodiment includes the synchronous motor control device of the first embodiment as a drive device for a compressor mounted in the air conditioner. FIG. 7 illustrates the air conditioner of a separate type in which an indoor unit is separated from an outdoor unit. In the second embodiment, the compressor drive system 100 for the outdoor unit of the separate type air conditioner will be described as an example. The compressor drive system 100 includes components similar to the components of the synchronous motor control device of the first embodiment.

The air conditioner includes the compressor drive system 100, a compressor 20 driven by AC power supplied from the inverter main circuit 5, a four-way valve 31, an outdoor heat exchanger 32-1, an indoor heat exchanger 32-2, and an expansion valve 33.

The compressor 20 includes a compression unit 21 that compresses a refrigerant and a synchronous motor 8 that drives the compression unit 21.

In the air conditioner illustrated in FIG. 7, the compressor 20, the four-way valve 31, the outdoor heat exchanger 32-1, the indoor heat exchanger 32-2, and the expansion valve 33 are installed via refrigerant piping 30 to form a refrigerant circuit circulating the refrigerant. The air conditioner performs an air conditioning operation while changing the pressure of the refrigerant passing through the piping by utilizing heat absorption or dissipation with respect to air with which heat is exchanged when the refrigerant evaporates or condenses. Air generated by rotation of a blower fan (not illustrated) flows to the outdoor heat exchanger 32-1. The outdoor heat exchanger 32-1 thus performs heat exchange between the refrigerant and the air.

Similarly, the air generated by the rotation of the blower fan (not illustrated) flows to the indoor heat exchanger 32-2. The indoor heat exchanger 32-2 thus performs heat exchange between the refrigerant and the air. Only the indoor heat exchanger 32-2 is disposed on the side of the indoor unit of the air conditioner except for the refrigerant piping 30, and the rest of the air conditioner is disposed on the side of the outdoor unit.

According to the second embodiment described above, the synchronous motor 8 is used as the drive source of the compressor 20, the synchronous motor control device 1 of the first embodiment is applied to the compressor drive system 100 connected to the compressor 20, and the compressor drive system 100 drives a permanent magnet synchronous motor which is the drive source of the compressor. When the synchronous motor 8 is used as the drive source of the compressor 20 compressing the refrigerant, as described above, it becomes possible to prevent the occurrence of demagnetization of the synchronous motor 8 caused by a short circuit of the shunt resistor 3a, and reduce the resulting expense for replacing the compressor 20. The quality of the air conditioner can be improved as a result.

The configuration illustrated in the aforementioned embodiments merely illustrates an example of the content of the present invention, and can thus be combined with another known technique or partially omitted and/or modified without departing from the scope of the present invention.

The invention claimed is:

1. A synchronous motor control device for controlling a permanent magnet synchronous motor, the device converting DC power supplied from a DC power supply into three-phase AC power, the device comprising:
    an inverter main circuit to convert the DC power into the three-phase AC power by using a plurality of switching elements and supply the three-phase AC power to the permanent magnet synchronous motor;
    a current detector to detect a direct current flowing through a DC bus between the DC power supply and the inverter main circuit;
    a voltage detector to detect a DC voltage between a positive side of the DC bus and a negative side of the DC bus; and
    an inverter controller to generate a pulse width modulation signal on the basis of the direct current and the DC voltage for controlling each of the plurality of switching elements, and output the pulse width modulation signal to the inverter main circuit, wherein
    the inverter controller includes:
    a phase current reproducer to reproduce from the direct current, phase currents flowing to the permanent magnet synchronous motor;
    a current coordinate transformer to transform the reproduced phase currents into current on a control coordinate axis of a rotating coordinate system;
    a current controller to calculate a voltage command value of the permanent magnet synchronous motor in such a manner that the current on the control coordinate axis equals a specific value; and
    a limiter to limit a value of the voltage command value, wherein the limiter has a first limiter value ($V\gamma\delta\_LIMIT\ 1$) set to be capable of protecting the permanent magnet synchronous motor against demagnetization and protecting the inverter main circuit against overcurrent, and a second limiter value ($V\gamma\delta\_LIMIT\ 2$) set to be larger than the first limiter value and limit the voltage command value in steady state control, the first limiter value is set to a value smaller than or equal to $Ra \times OC\_LEVEL \times \sqrt{(3/2)}$, where Ra denotes a phase resistance value of the permanent magnet synchronous motor and OC_LEVEL denotes an overcurrent protection level capable of protecting the permanent magnet synchronous motor against demagnetization and protecting the inverter main circuit against overcurrent, and the limiter keeps the first limiter value when the permanent magnet synchronous motor starts up, and switches from the first limiter value to the second limiter value when the current value on the control coordinate axis reaches the specific value.

2. A compressor drive system for controlling a permanent magnet synchronous motor used as a drive source of a compressor, the compressor drive system converting DC power supplied from a DC power supply into three-phase AC power, the compressor drive system comprising:

an inverter main circuit to convert the DC power into the three-phase AC power by using a plurality of switching elements and supply the three-phase AC power to the permanent magnet synchronous motor;

a current detector to detect a direct current flowing through a DC bus between the DC power supply and the inverter main circuit;

a voltage detector to detect a DC voltage between a positive side of the DC bus and a negative side of the DC bus; and an inverter controller to generate a pulse width modulation signal from the direct current and the DC voltage for controlling each of the plurality of switching elements, and output the pulse width modulation signal to the inverter main circuit, wherein the inverter controller includes:

a phase current reproducer to reproduce from the direct current, phase currents flowing to the permanent magnet synchronous motor;

a current coordinate transformer to transform the reproduced phase currents into current on a control coordinate axis of a rotating coordinate system;

a current controller to calculate a voltage command value of the permanent magnet synchronous motor in such a manner that the current on the control coordinate axis equals a specific value; and a limiter to limit a value of the voltage command value, wherein the limiter has a first limiter value ($V\gamma\delta\_LIMIT\ 1$) set to be capable of protecting the permanent magnet synchronous motor against demagnetization and protecting the inverter main circuit against overcurrent, and a second limiter value ($V\gamma\delta\_LIMIT\ 2$) set to be larger than the first limiter value and limit the voltage command value in steady state control, the first limiter value is set to a value smaller than or equal to $Ra \times OC\_LEVEL \times \sqrt{(3/2)}$, where Ra denotes a phase resistance value of the permanent magnet synchronous motor and OC_LEVEL denotes an overcurrent protection level capable of protecting the permanent magnet synchronous motor against demagnetization and protecting the inverter main circuit against overcurrent, and the limiter keeps the first limiter value when the permanent magnet synchronous motor starts up, and switches from the first limiter value to the second limiter value when the current value on the control coordinate axis reaches the specific value.

3. An air conditioner for circulating a refrigerant by the compressor drive system according to claim 2.

* * * * *